United States Patent
Barrier, IV et al.

(10) Patent No.: US 11,218,345 B2
(45) Date of Patent: Jan. 4, 2022

(54) USING ISI OR Q CALCULATION TO ADAPT EQUALIZER SETTINGS

(71) Applicant: MACOM Technology Solutions Holdings, Inc., Lowell, CA (US)

(72) Inventors: George L. Barrier, IV, Lowell, MA (US); Fernando Gonzalez, Lowell, MA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/026,041

(22) Filed: Sep. 18, 2020

(65) Prior Publication Data

US 2021/0091983 A1 Mar. 25, 2021

Related U.S. Application Data

(60) Provisional application No. 62/902,815, filed on Sep. 19, 2019, provisional application No. 62/986,543, (Continued)

(51) Int. Cl.
*H04L 27/01* (2006.01)
*H04L 27/00* (2006.01)
*H04L 25/03* (2006.01)

(52) U.S. Cl.
CPC ........ *H04L 27/01* (2013.01); *H04L 25/03834* (2013.01); *H04L 25/03993* (2013.01); *H04L 27/0014* (2013.01); *H04L 2027/0038* (2013.01)

(58) Field of Classification Search
CPC ....... H04L 2027/0038; H04L 25/03019; H04L 25/03834; H04L 25/03993; H04L 25/491; H04L 27/0014; H04L 27/01
See application file for complete search history.

(56) References Cited

U.S. PATENT DOCUMENTS

| | | | |
|---|---|---|---|
| 5,019,769 | A | 5/1991 | Levinson |
| 5,383,208 | A | 1/1995 | Queniat et al. |

(Continued)

FOREIGN PATENT DOCUMENTS

| | | |
|---|---|---|
| EP | 3500867 | 6/2019 |
| KR | 101684801 | 12/2016 |

(Continued)

OTHER PUBLICATIONS

U.S. Appl. No. 10/404,496, filed Sep. 2019, Azenkot.
(Continued)

*Primary Examiner* — David S Huang
(74) *Attorney, Agent, or Firm* — Weide & Miller, Ltd.

(57) ABSTRACT

A method and apparatus for processing a signal to generate equalizer codes, which are used to control equalization of the signal, that comprises processing the signal to identify the eyes of the signal, and for each eye, calculating an eye height and calculating a noise value. For each eye, squaring the eye height to generate an eye height product and dividing the eye height product by the noise value to generate a $Q^2$ value. Using the calculated $Q^2$ values optimizing, through adaptation, the equalizer codes. Calculating the noise values may include calculating an ISI value for each band of the signal and then calculating the eye height for each eye as the difference between the adjacent upper average value and the adjacent lower average value. Then, for each eye, calculating a noise value by summing the ISI value for the band above the eye and the band below the eye.

20 Claims, 7 Drawing Sheets

Related U.S. Application Data filed on Mar. 6, 2020, provisional application No. 63/053,070, filed on Jul. 17, 2020.

(56) References Cited

U.S. PATENT DOCUMENTS

| | | |
|---|---|---|
| 5,396,059 A | 3/1995 | Yeates |
| 5,594,748 A | 1/1997 | Jabr |
| 5,812,572 A | 9/1998 | King et al. |
| 6,438,450 B1 | 8/2002 | DiLorenzo |
| 6,494,370 B1 | 12/2002 | Sanchez |
| 6,556,601 B2 | 4/2003 | Nagata |
| 6,707,492 B1 | 3/2004 | Itani |
| 6,934,479 B2 | 8/2005 | Sakamoto et al. |
| 6,952,531 B2 | 10/2005 | Aronson et al. |
| 7,227,916 B2 | 6/2007 | Ruelke et al. |
| 7,236,108 B2 | 6/2007 | Cheng |
| 7,265,334 B2 | 9/2007 | Draper et al. |
| 7,276,682 B2 | 10/2007 | Draper et al. |
| 7,381,935 B2 | 6/2008 | Sada et al. |
| 7,456,690 B2 | 11/2008 | Kocaman |
| 7,505,498 B2 | 3/2009 | Sanchez |
| 7,701,833 B2 | 4/2010 | Kim |
| 7,734,309 B2 | 6/2010 | Chi et al. |
| 7,949,025 B2 | 5/2011 | Olea |
| 8,213,494 B2 | 7/2012 | Hidaka |
| 8,861,578 B1 | 10/2014 | Lusted et al. |
| 9,231,803 B2 | 1/2016 | Nishi |
| 9,397,868 B1 | 7/2016 | Hossain et al. |
| 9,559,880 B1 | 1/2017 | Cirit et al. |
| 9,853,735 B1 | 12/2017 | Lin |
| 9,853,839 B2 | 12/2017 | Beukema et al. |
| 9,882,703 B1 | 1/2018 | Xu |
| 9,906,232 B1 | 2/2018 | Cho |
| 10,333,692 B2 | 6/2019 | Miura |
| 2003/0165168 A1 | 9/2003 | Murata |
| 2004/0188717 A1 | 9/2004 | Ono |
| 2005/0226355 A1 | 10/2005 | Kibune et al. |
| 2006/0098699 A1 | 5/2006 | Sanchez |
| 2006/0126683 A1 | 6/2006 | Kang |
| 2006/0153256 A1 | 7/2006 | Sanchez |
| 2006/0165139 A1 | 7/2006 | Sanchez |
| 2015/0180642 A1 | 6/2015 | Hsieh et al. |
| 2015/0381393 A1 | 12/2015 | Kotagiri |
| 2016/0006589 A1 | 1/2016 | Kamali |
| 2016/0352557 A1 | 12/2016 | Liao |
| 2017/0070370 A1 | 3/2017 | He et al. |
| 2017/0288369 A1 | 10/2017 | Ikram et al. |
| 2017/0310510 A1* | 10/2017 | Hidaka ............. H04L 25/03057 |
| 2020/0195475 A1 | 6/2020 | Lin |

FOREIGN PATENT DOCUMENTS

| | | |
|---|---|---|
| KR | 102017014818 | 12/2018 |
| KR | 1020180049784 | 5/2019 |
| WO | WO 2008/070138 | 6/2008 |
| WO | WO 2018/080652 | 5/2018 |

OTHER PUBLICATIONS

French National Institute of Industrial Property ("INPI") Preliminary Report issued for Application No. FR191046 dated Jun. 19, 2020.

International Search Report issued for Application No. PCT/US2020/050919 dated Dec. 23, 2020.

International Search Report issued for Application No. PCT/US2020/051657 dated Jan. 13, 2021.

* cited by examiner

USING ISI OR Q CALCULATION TO ADAPT EQUALIZER SETTINGS

FIELD OF THE INVENTION

The invention relates to signal analysis and equalizer settings, and, in particular, a method for using an ISI or Q calculation to adapt an equalizer.

RELATED ART

After a signal passes through a channel it becomes distorted due to the distorting nature of the channel. Various signal processing techniques are used to restore the received signal and recover the data represented by the signal. One such processing technique is equalization using an equalizer device. The equalizer has settings which must be adjusted to adapt the equalizer to the channel to provide optimal signal processing. In the prior art, Inter-Symbol Interference (ISI) was calculated and used to select the best equalizer settings. However, with testing, it has been revealed that this prior art method for determining equalizer settings was inaccurate. Typically, the equalizer settings are set too low by this method, and the error is not consistent over signal variations, such that a simple offset adjustment would not provide an accurate result. Other prior art expanded this approach to combine ISI and eye height to form an OEH (Open Eye Height) calculation and an OEA (Open Eye Area) calculation to be used for adaptation. As a result, there is a need in the art for a low-power eye monitor along with a method and system to adapt equalizer settings to optimize Bit Error Rate (BER).

SUMMARY

To overcome the drawbacks of the prior art, a method for processing a signal, received over time, to generate equalizer codes which are used to control equalization of the signal. In one embodiment, the method comprises processing the signal to identify the eyes of the signal, and processing the signal to calculate an eye height for each eye processing the signal to calculate a noise value for each eye. Then, for each eye, multiplying the eye height by the eye height to generate an eye height product. For each eye, dividing the eye height product by the noise value to generate a $Q^2$ value, and, using the calculated $Q^2$ values, adapting the equalizer codes to an optimal equalizer setting.

This method may further comprise calculating the noise values by calculating an ISI value for each band of the signal, calculating the eye height for each eye as the difference between the adjacent upper average value and the adjacent lower average value, and for each eye, calculating a noise value by summing the ISI value for the band above the eye and the band below the eye. Each band is a possible quantizer output level. In one embodiment, the optimal equalizer settings establish the smallest eye as large as possible or establish the sum of all eyes as large as possible. It is contemplated that this method may occur in a communication system to account for signal degradation in a channel. The adaption of the equalizer codes comprises an iteration process in which two or more different equalizer codes are used to generate ISI values that correspond to the equalizer codes, and the different ISI values are processed and compared to determine optimal equalizer codes.

Also disclosed herein is a method for processing a signal, received over time, to generate equalizer codes. In one embodiment, this method includes processing the signal to identify the eyes of the signal, and processing the signal to generate ISI values for each band of the signal. Then, calculating the eye height for each eye as the difference between the adjacent upper average value and the adjacent lower average value. For each eye, calculating a noise value by summing the ISI value for the band above the eye and the band below the eye, and divide each eye height by the calculated noise value for the associated eye to thereby generate a Q value for each eye. Then, using the calculated Q values, adapting the equalizer codes to an optimal equalizer setting.

In one configuration, the optimal equalizer settings establish the smallest eye as large as possible or establish the sum of all eyes as large as possible. The signal may be a PAM format signal. In one embodiment, the method is performed in a communication system to account for signal degradation in a channel. This method may further comprise squaring each Q value to more easily identify a peak in the $Q^2$ value during adaptation. The step of adapting the equalizer code comprises an iteration process in which two or more different equalizer codes are used to generate Q values that correspond to equalizer codes and the Q values are processed and the results of the processing compared to determine optimal equalizer codes. The results of the processing are shown in FIGS. 4A-4D.

Also disclosed is a system for equalizing a signal using equalizer codes. The system may include an equalizer configured to equalize the signal based on equalizer codes and a controller configured to process the signal and generate equalizer codes such as by processing the signal to identify the eyes of the signal, and process the signal to generate ISI values for each band of the signal. Then, calculate the eye height for each eye as the difference between the adjacent upper average value and the adjacent lower average value and for each eye, calculating a noise value by summing the ISI value for the band above the eye and the band below the eye. The controller also divides each eye height by the calculated noise value for the associated eye to thereby generate a Q value for each eye and uses the calculated Q values to adapt the equalizer codes to an optimal equalizer setting.

The bands may be the possible quantizer output levels. It is contemplated that the optimal equalizer settings may establish the smallest eye as large as possible or establish the sum of all eyes as large as possible. In one configuration, the signal is a PAM format signal and there are four bands and three eyes. The method may be performed in a communication system to account for signal degradation in a channel. The method may further comprise squaring each Q value to more easily identify a peak in the equalizer output during adaptation. In one embodiment, the step of adapting the equalizer code comprises an iteration process in which two or more different equalizer codes are used to generate different $Q^2$ values and the different $Q^2$ values are processed and compared to determine optimal equalizer codes. The signal may also be processed as part of or after the determining the optimal equalizer codes.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the prin

DETAILED DESCRIPTION

Disclosed below is a summary of the innovation followed by a more detailed discussion with reference to FIG. 1. To overcome the drawbacks of the prior art, using statistical analysis, the sample plots reveal band centers and band noise, which can be processed and combined to estimate the Q result. These same band centers and band noise were used to calculate OEH or OEA. However, the OEH result can become blind when the Q parameter is set too high or when the input eye is very small or noisy. This blindness renders the OEH adaptation unable to decide which direction to adjust the CTLE setting in some circumstances. The OEA calculation sometimes converges to a short/wide eye over a tall/narrow eye even though a taller eye is preferred even if it is narrow. The Q ratio of eye height to ISI is much less likely to produce a blinding zero result and optimizing it at just one phase angle (angle with maximum Q result) leads to a better equalizer setting as compared to the prior art method. Shown in FIG. 1, there are four bands, namely band0 168, band1 162, band2 164, and band3 166. For signal amplitude bands 0, 1, 2, 3, the Q results 0, 1, 2 (bottom, middle, top) are computed using the following: equations $Q[n]=(band\_center[n+1]-band\_center[n])/(band\_noise[n+1]+band\_noise[n])$ where n is one of the eye openings 0, 1, 2.

Figure 1:
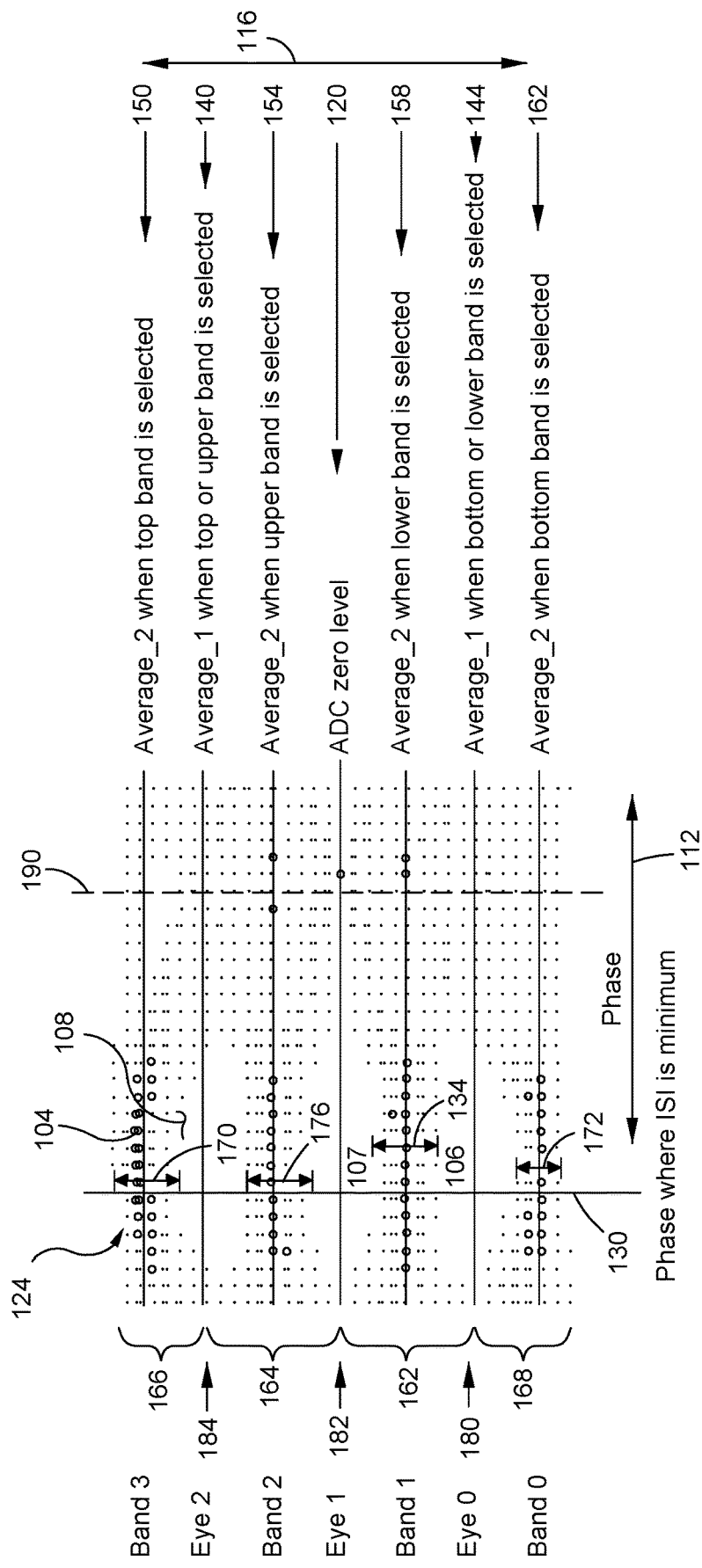
- FIG. 1 is an example sample plot showing an eye diagram.

To aid in understanding a graphical representation of some of the terms used herein, FIG. 1 is provided and discussed. This is but one possible eye diagram formed from sample plots and these principles may be applied to numerous other signals, signal types, and environments of use. FIG. 1 is a sample plot showing an eye diagram.

In FIG. 1, the samples 104 of a received signal are plotted in relation to phase 112 on the horizontal axis and sample magnitude (voltage) on the vertical axis 116. Over different phases of the signal the various samples are plotted based on the magnitude (voltage) of each sample. Over the range of phases, the samples form areas of higher sample density 124 and areas with few to no samples referred to as an eye 108. The eye crossing 190 is also shown.

In this example embodiment based on a PAM4 signal, there are four bands 168, 162, 164, 166 such that the bands define the four levels of the PAM4 signal. In other embodiments, any PAM format signal may be used, such as PAM2 (NRZ) PAM8, PAM4, PAM 16, or any PAM format. As shown in FIG. 1, band0 168 is the lowest band, followed by band1 162, band2 164, and at the top, band3 166. During processing, the received signal will be sliced or quantized to one of these four bands to define the received signal at the sampling phase or time as either a 0, 1, 2, or 3 signal level. Between each band is an eye, such as the top eye 108. As shown, there is an eye0 106, between band0 and band1, an eye1 107, between band1 and band2, and an eye2 108 between band2 and band3. The eyes are the areas free from samples.

At some amplitude and phase, for each eye, is a threshold level 180, 182, 184. The threshold is defined at a magnitude that is boundary such that samples having a magnitude below the threshold are sliced to the band directly below the threshold and samples having a magnitude above the threshold are sliced to the band directly above the threshold. In this manner, a sample received at sampling phase angle 130 has its amplitude evaluated and depending on its value in relation to the thresholds 180, 182, 184, one of which is located in each eye opening. Based on the samples value in relation to the thresholds 180, 812, 184, the sample is quantized or sliced to one of the four band values, such as band0, band1, band2, or band3.

Also shown in FIG. 1 is intersymbol interference (hereafter ISI) 134. The ISI is a measure of noise because it is the distribution of symbol values at the sampling phase point 130. A large ISI value indicates a wide distribution of sample values at the sampling phase point 130, which indicates a higher noise level than if all the samples at the sampling phase point were at the same amplitude.

In one embodiment, the eye monitor generates a code, such as a 10 bit code, that corresponds to a magnitude of a sample, and these samples are plotted versus phase to generate the eye diagram as shown in FIG. 1. The phase is generally analogous to sampling time. The phase rotates to 360 degrees and then repeats. The sampling point may also be referred to as a phase delay or phase angle.

If the sampling point is at the middle of an eye and then ideally all samples fall within narrow areas at or near a band that are dense with samples. If samples at the sampling phase angle are close to a threshold crossing 180, 182, 184, then the samples are distributed, and it is difficult to determine where one eye starts and another ends. If all samples are averaged together, then the average zero 120 is a magnitude at which half the samples are greater than the average zero line and half of the samples are less than the average zero line.

Using this notation, the samples may be defined as being above average zero 120 and below average zero 120. Now, working with the sample group that is greater than average zero 120, it is possible to divide that group into two sample sets based on the sample's value in relation to an average1 level 140. The average1 level is a magnitude in which, working from samples that are greater than the average zero level, half of the samples are greater than the average1 level 140, and half of the samples are less than the average1 level 140.

Likewise, working with the sample group that is less than average zero 120, it is possible to divide that group into two samples sets based on the sample's value in relation to an average1 level 144. The average1 level 144 is a magnitude in which, working from samples that are less than the average zero level, half of the samples are greater than the average1 level 144 and half of the samples are less than the average1 level 144.

These subgroups of sample may be further divided based the average2 levels 150, 154, 158, 162 which are selected in the same general way. The same process is followed for calculation of each average2 levels 150, 154, 158, 162. An exemplary process is described for determining the average1 level 150. Working with the group of samples which are greater than the average1 level 140, the average2 level 150 is a magnitude in which half of the samples are greater than the average2 level 150 and half of the samples are less than the average2 level 150. This defines how each of the average levels 120, 140, 144, 150, 154, 158, 162 are calculated.

Next, a process to calculate an ISI value 134 is discussed below. ISI represent intersymbol interference, which is a form of distortion of a signal in which one symbol interferes with subsequent symbols. This is an unwanted phenomenon as the previous symbols have similar effect as noise, thus making the communication less reliable. The spreading of the pulse beyond its allotted time interval causes it to interfere with neighboring pulses. ISI is usually caused by multipath propagation or the inherent linear or non-linear frequency response of a communication channel causing successive symbols to "blur" together.

In this embodiment, an ISI value 134 is calculated for each band 168, 162, 164, 166. The process is discussed for the average level 150 for band3. This process would be repeated for each band to calculate ISI0 172, ISI1134, ISI2 176, ISI3170. For band3 166, the average2 level 150 is used and determined based on the above calculation and from this line or magnitude of reference, the distance between each sample from the average2 level 150 is calculated. ISI value calculation is known in the art and thus not described in detail.

Based on the distribution calculation described above, the largest 25% of sample values are found in region 166, also referred to being centered around band3 166, which is the average2 level 150. Likewise, the smallest 25% of sample values are found in region (band) 168 and are centered around band0 168, which is the average2 level 162.

Returning to the samples in region 166, these samples are averaged together to form the average2 level 150. Then, using the average2 level 150, the difference between each sample and the average2 level 150 is calculated. This yields a difference value between the sample value and the average2 level 150. Then, an absolute value function is performed on the difference values which yields only positive values for the difference values. The resulting group of positive difference values are averaged together, and this average is the ISI for that band, in this case, ISI 170 for band3 166. Stated another way, the thickness of the sample band at the sampling point is the ISI, which is the noise, or deviation of the samples at the sampling point.

In prior embodiments, a root mean square calculation was used to obtain the deviation that determines the ISI result. While yielding a good result, it suffers from being computationally complex, and it is processor intensive. Stated another way, the root mean square calculation takes too many clock cycles to compute. Proposed as an alternative is calculation of the ISI values using "mean average deviation" (MAD). The MAD calculation of a data set is the average of the absolute deviations from a central point. It is a summary statistic of statistical dispersion or variability.

Method for Calculating Q Value

Further disclosed herein is a method for calculating Q. Using the Q method described below, the ISI calculations are performed four times, one for each band. This is an improvement over the prior art which only calculated a single ISI based on one band. Using the average2 bands 150, 154, 158, 162 ISI values are calculated for each band giving 4 ISI values.

Next, this method analyzes and considers the three eyes 106, 107, 108. First considering the three eyes, referred to for this discussion as bottom eye (eye0 106), middle eye (eye1 107), and top eye (eye2 108), if the bottom eye is analyzed, and it is located between band0 and band1. Hence, each eye is sandwiched between two bands. This method defines the eye height for the bottom eye (eye0 106) as the value for average2 158 minus the value of average2 162. This is how eye height is initially defined. Eye height is then divided by the ISI value (noise) for the associated band. The noise for eye0 is ISI1 134 plus ISI0 172. This sum is the noise for eye0 106.

The focus of this discussion is on eye0 106. Next, for the noise value for eye0 106, the eye height just calculated for eye0 is divided by the noise for eye0. Hence, the Q for eye0 is (average2 level 158 minus average2 level 162) divided by (the sum of ISI0 172 plus ISI1 134). This same calculation process is performed for each of the three eyes to generate a Q result for each eye. For each calculation, the values used in the Q calculation would correspond to the values for that particular corresponding eye.

Using this method, it is possible to adapt the equalizer to establish the smallest eye as big as possible or adapt the equalizer to establish the sum of all eyes as big as possible. In other embodiments other optimization parameters are possible, such as but not limited to, establishing each eye the same size, or establishing eye2 (or any particular eye's Q) as the largest. During adaptation, not only are the optimal codes calculated for the selected optimization parameter, but the various different optimization parameters may be utilized and adapted to determine which optimization parameters (with associated optimal equalizer codes) achieves the lowest bit error rate.

Improved Q Value Calculation ($Q^2$)

Also disclosed herein is a new and novel method for calculating the Q value for use with the disclosed system and method. As discussed above, the Q value is used to calculate or determine the optimum the equalizer settings.

In the Q calculation method disclosed above, the value Q is calculated as Q=eye height/noise, which is referenced above as $Q[n]=(band\_center[n+1]-band\_center[n])/(band\_noise[n+1]+band\_noise[n])$ where n is one of the eye openings 0, 1, 2. While this operation yields good results, improvements are possible by modifying the Q calculation to instead calculate Q (e.g. $Q^2$) with the following equation: $Q^2$=eye height*eye height/noise.

In both wire line and optical system, it is important to identify equalizer code setting which optimize signal equalization. Any type equalizer may be used including, but not limited to, a CTLE, FFE, DFE. In one embodiment, a root mean square operation can be used to calculate a Q value. This can be done by squaring the noise values, then sum the resulting squared noise value, and then take the square root of the sum. However, in signal processing and computer environments, the square root operation is difficult, complex, as well as time and power consuming. As a result, advantages are realized by avoiding use of the square root operation when calculating Q.

In the Q calculation and equalizer code optimization, the underlying goal is to determine the peak of the Q curve, which reveals optimal CTLE settings. Stated another way, the goal is to determine which CTLE codes yield optimal equalization and the best CTLE codes are derived at the peak Q value, i.e. the Q value that corresponds to the peak of the Q curve. FIG. 4A-4D illustrate exemplary Q curves. However, in some embodiments, the Q curve is generally flat (See FIG. 4A) resulting in a limited differential between peak Q and the other Q values which are near the peak Q value. For example, and not limitation, optic systems may have smaller peaks in the Q curve as compared to wire line systems, making peak detection challenging. This in turn makes it difficult to determine the optimal equalizer codes.

To address and overcome this problem, the new Q calculation method is disclosed which avoids the complex, time consuming and lengthy square root operation while increasing the ability to identify the peak Q value in relation to other Q values. The disclosed Q calculation, for each eye, is defined as $Q^2$=(eye height*eye height)/noise. Thus, as compared to the RMS version of the equation both the numerator and the denominator are squared. The squaring of the denominator eliminates the unwanted square root operation and squares the eye height. This eliminates the unwanted square root operation. Consequently, a single multiplication operation occurs (on the numerator), which is much less complicated and not as lengthy as compared to a square root operation. This new $Q^2$ calculation yields a Q squared value which is larger due to the square operation and has a more pronounced peak compared to the previously disclosed method, making it easier to locate the peak Q value or the peak in the Q curve (steepens the curve leading to the peak in the Q curve).

For example, assume a Q curve having two peaks, one at 12 unit magnitude and the other at 13 unit magnitude. The difference between these Q value peaks is 1 unit (13−12=1) and this difference may be difficult to detect. However, if both Q values peaks are squared, the 12 unit magnitude squared becomes 144 unit magnitude and the 13 unit magnitude squared becomes 169 unit magnitude. This results in a difference of 169−144=25 units, which results in the curve peak at the 169 unit magnitude being much easier to detect as compared to the next closes plot location of 144 unit magnitude.

Although disclosed as a square operation, additional or other operations may occur to increase the Q value while also avoiding the unwanted square root operation. For example, the numerator and denominator may be cubed or taken to the $4^{th}$ power. This mathematical operation does not change the location of the peak in the Q curve, only the amplitude, thereby increasing accuracy of the Q curve peak (peak Q value) detection. Similarly, because the peak Q curve location does not change, the ability to determine optimal equalizer codes is likewise unchanged. A further benefit of this new method of calculating Q as compared to the RMS method (using a square root operation) is increased accuracy because the lengthy and complex square root operation leads to rounding errors which compound. It is further noted that these operations and calculations may occur in software (such as with machine executable code, stored in a non-transitory state on a memory, that is executed by a processor), in a hardware configuration, or a combination of both. Further, the methods and operation disclosed herein may be implemented in the analog domain, digital domain, or a combination of both.

To establish the equalizer settings, the equalizer is set with a particular boost level (equalization setting) and the Q is measured (and stored) for this equalizer setting. The equalization settings are increased, and the Q is again measured and recorded. At that time, the equalization settings are decreased, and the Q is again measured and recorded. The Q results for each equalizer settings are then compared, and the equalizer setting which yields the largest Q is selected to be the better equalizer setting. It is understood that more than one iteration using different equalizer settings may be required until the ideal equalizer settings are discovered. When calculating the $Q^2$ value, as discussed above, the same process and iteration method is used to adapt the equalizer as was used based on unsquared Q.

In one embodiment, this processing may be performed in a processing element that is hardwired to perform the calculations described herein. The processing element may comprise an ASIC, a DSP, a processor configured to execute non-transitory machine readable code stored in a memory, a state machine, controller, control logic, or any other system, or any combination of these elements. Software code, referred to as machine executable instructions maybe executed by these elements as part of the processing.

Optimum sampling, slicing, or quantization of the received signal occurs at a sampling point (phase) when the samples are closest to the band and an optimized eye height opening minimizes bit errors.

Figure 2:
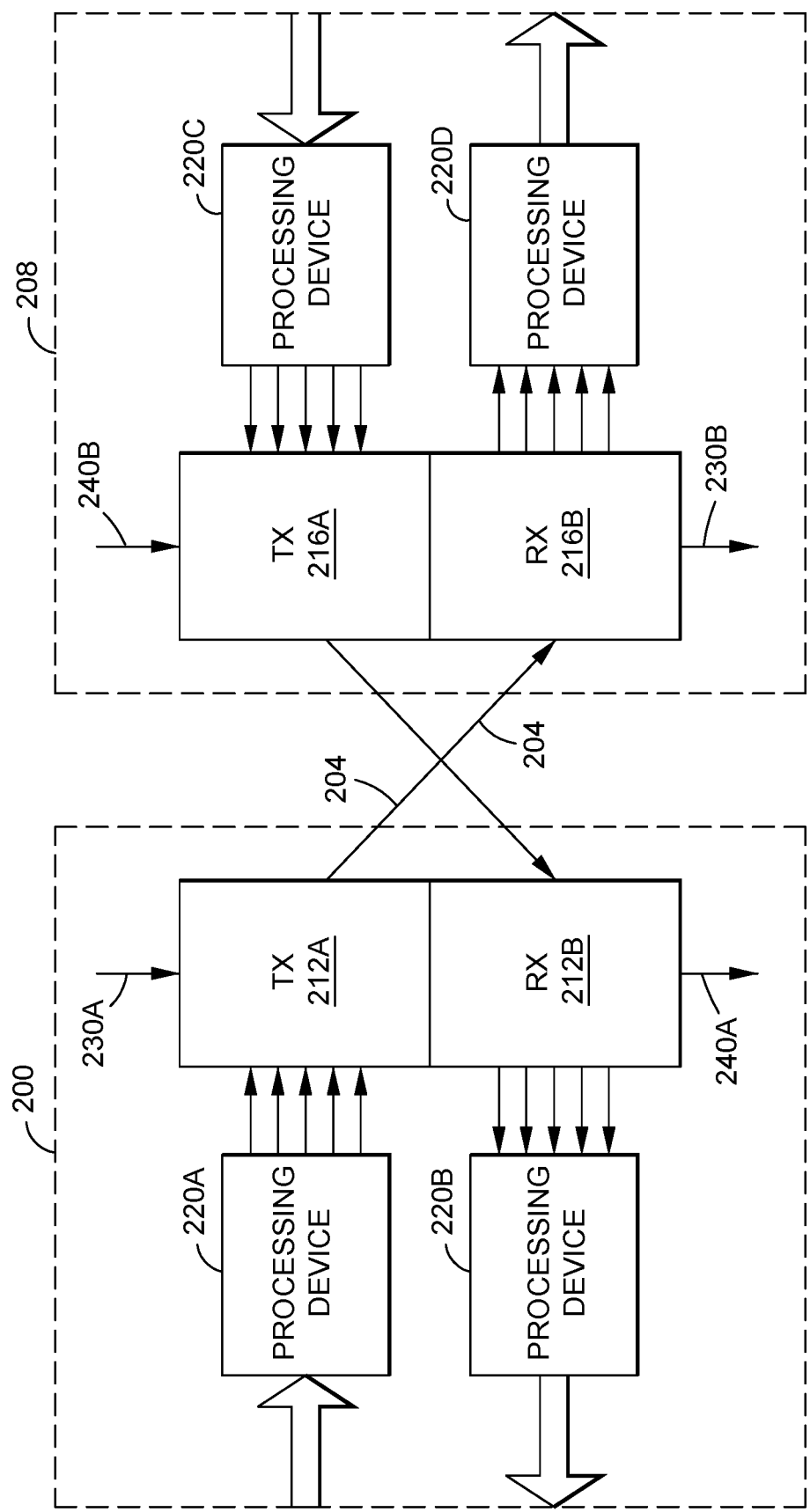
FIG. 2 illustrates a block diagram of an example embodiment of a multi-station communication system.

FIG. 2 illustrates a block diagram of an example embodiment of a multi-station communication system configured in accordance with the method and apparatus disclosed herein. As shown, a first station 200 is configured to communicate over one or more channels 204 with a second station 208. Each of the first station 200 and the second station 208 may comprise a receiver 212B, 216B and a transmitter 212A, 216A. At least one of the receivers 212B, 216B and transmitters 212A, 216A connect to a processing device 220A, 220B, 220C, 220D as shown. The processing devices 220 may comprise one or more of a processor, ASIC, control logic, state machine, switch fabric, modulator, demodulator, or any other such device. The processing device 220 may be configured to perform signal equalization, filtering, or any other type of signal processing or signal analysis as discussed herein, such as the calculations for the equalizer settings. Input to the processing devices 220 may occur in any manner known in the art. Similarly, although certain paths or interfaces are shown as either serial or parallel, it is fully contemplated that any of these paths may be configured as either serial or parallel paths or both.

Optional inputs 230A, 240B to the transmitters 212A, 216A, comprise inputs that are provided for system data so that system data may be processed within or by the transmitters. This may allow the system data to be transmitted over the channel(s) 204 with the network data. Similarly, the receivers 212B, 216B output signals 240A, 230B which provide system data that was recovered or separated from the signal transmitted over channel 204.

Figure 3A:
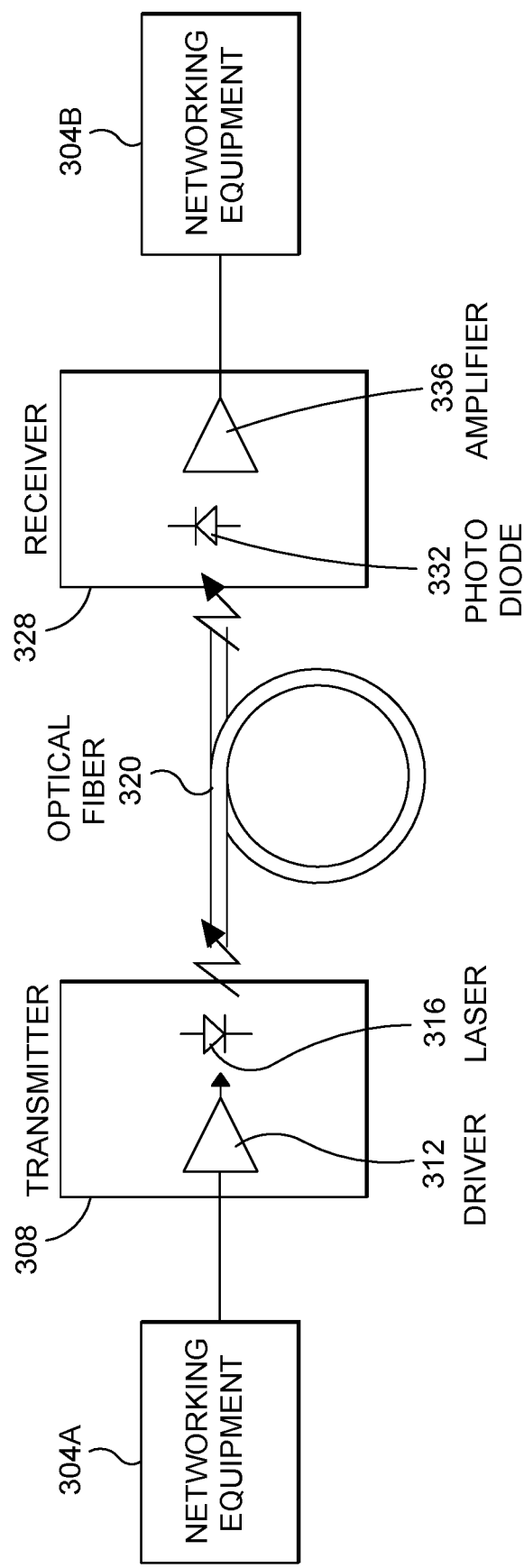
FIG. 3A illustrates an exemplary optic fiber communication link.

One example environment of use is in an optic communication system that utilizes optical fiber links and lasers or some other form of optic signal generator (light source). FIG. 3A illustrates an exemplary optic fiber communication link. To enable communication between remote networking equipment 304A, 304B a fiber optic transmitter and receiver is provided. Laser drivers 312, part of a transmitter 308, drive the lasers 316 with a modulating current which produces modulating optical output from lasers. This optical output is coupled into the optical fiber 320 for signal transmission. At the receive side of the optical fiber link is a receiver 328. Optical energy is converted into electrical signals by a photodiode 332 and processed further by an amplifier 336 to set the signal magnitude to a level suitable for further processing. Furthermore, although shown as a single path from network equipment 304A to networking equipment 304B, it is contemplated that data flow on the communication path may be bi-directional or that a separate return path may be provided from network equipment 304B to networking equipment 304A. It is contemplated that the innovation disclosed herein may be used in other environments.

Figure 3B:
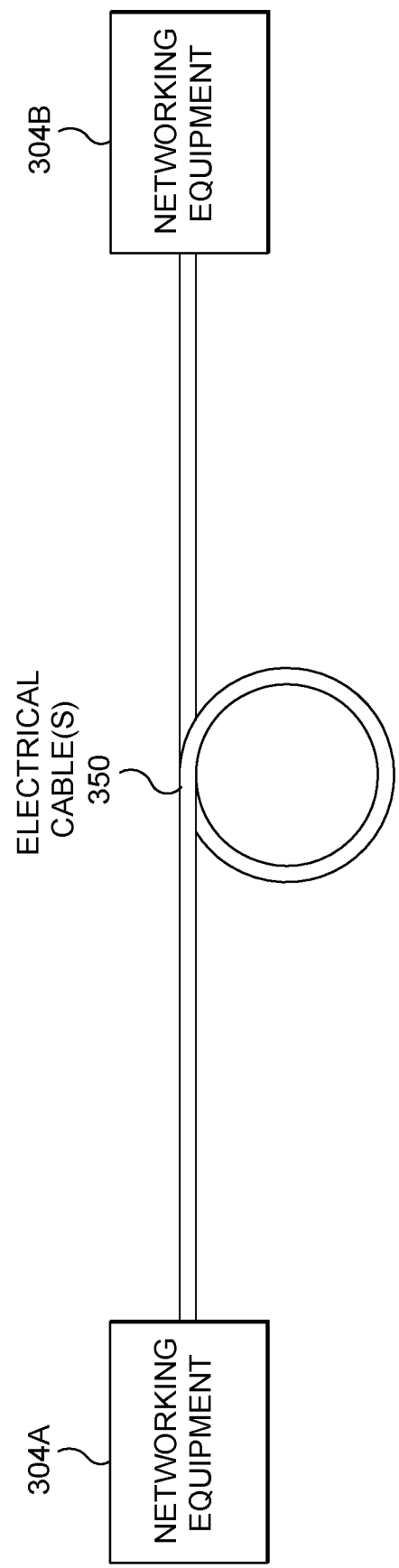
FIG. 3B illustrates an exemplary wire line communication link.

FIG. 3B illustrates an exemplary wireline communication link. As compared to FIG. 3A, identical elements are labeled with identical reference numbers. Instead of a optical communication path and optical transmitters and receiver as shown in FIG. 3A, shown is a wireline system having electrical cable(s) 350 which connect to the networking equipment 304A, 304B. Communication devices which utilized a conductive channel are known and not described herein. It is also contemplated that the innovations disclosed herein may be use in a wireless system, or any system that would benefit from the improved equalizer code generation as disclosed herein.

Figure 4A:
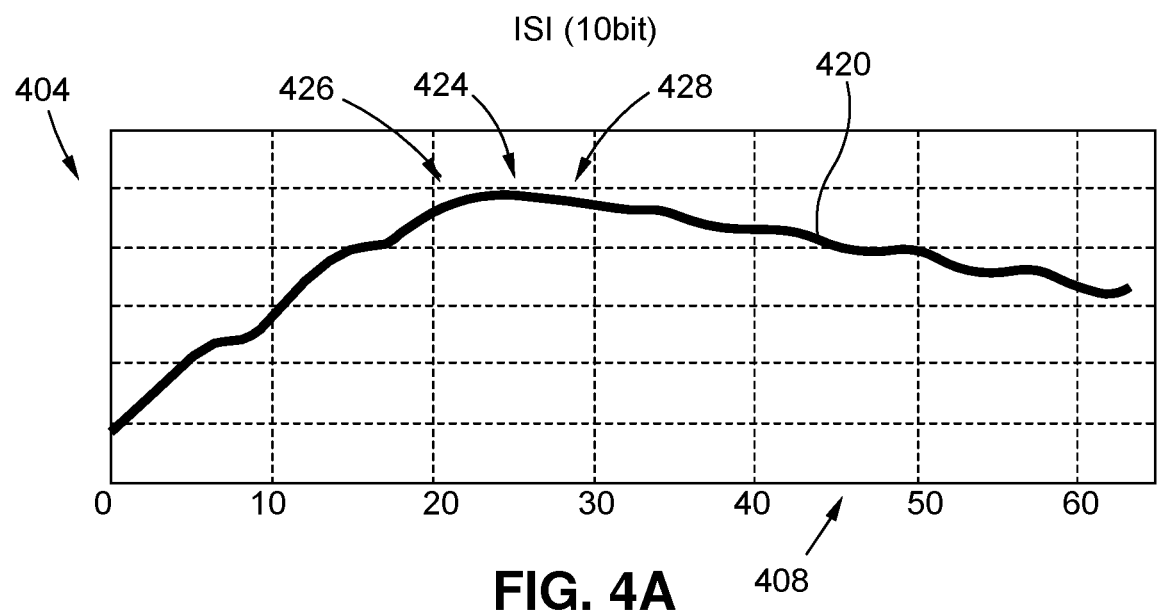
FIG. 4A illustrates exemplary plots of ISI based on equalizer codes (coefficients) which were adapted based on ISI.

FIGS. 4A, 4B, 4C and 4D illustrate exemplary plots of intersymbol interference for various equalizer codes. In FIG. 4A, the vertical axis 404 represents intersymbol interference (ISI) while the horizontal axis 408 represents CTLE codes. The ISI graph values are actually (1-ISI) so that the curve is not inverted relative to the other methods shown in FIGS. 4B, 4C and 4D. The plot 420 in FIG. 4A represents the ISI based on various different equalizer codes (such as CTLE coefficients). In the plot 420 the peak 424 is shown as the maximum plot value. As can be seen, it can be difficult to distinguish the peak 424 from plot locations 426, 428 which are near the peak. As a result, selecting the optimal equalizer code is difficult when the peak 424 is not clearly defined.

Figure 4B:
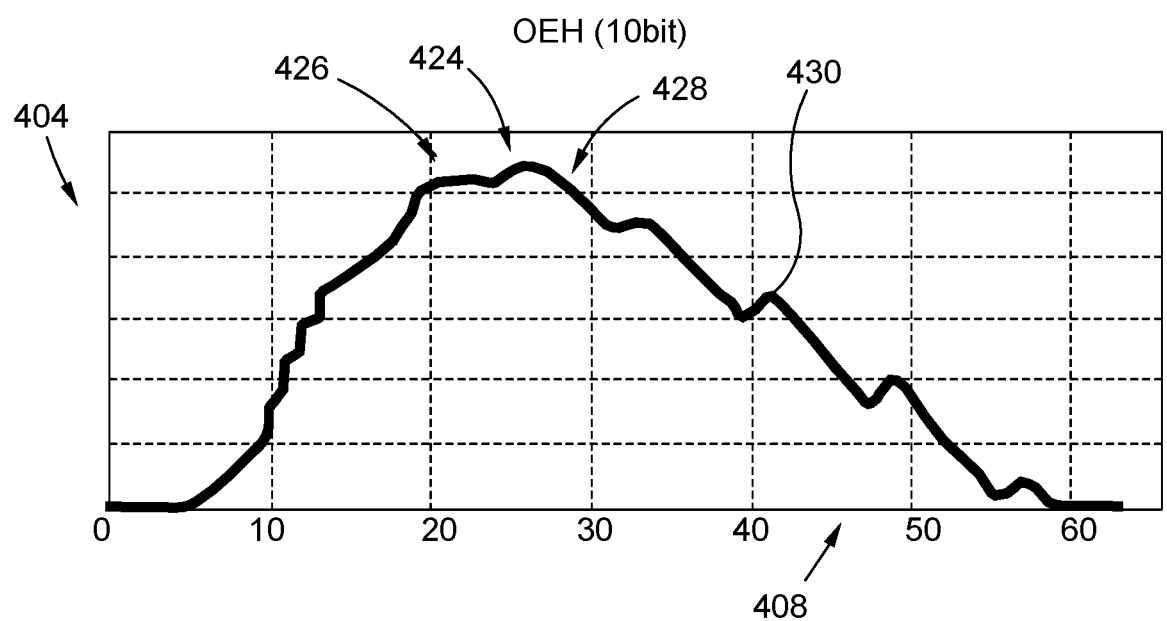
FIG. 4B illustrates exemplary plots of open eye height for various equalizer codes using the open eye height method for determining equalizer codes.

FIG. 4B illustrate exemplary plots of open eye height for various equalizer codes using the open eye height method for determining equalizer codes. In FIG. 4B, the vertical axis 404 represents open eye height (OEH) while the horizontal axis 408 represents CTLE codes. As shown, the plot 430 has a peak 424. The peak 424 is associated with the optimal equalizer code. As can be seen in plot 430, the peak 424 is easier to distinguish over adjacent plot points 426, 428 which are associated with good but non-optimal equalizer codes. As can be seen in FIG. 4B the plot 430 has a greater slope value than the plot 420 of FIG. 4A thus making it easier to distinguish the peak 424 from other points on the plot.

Figure 4C:
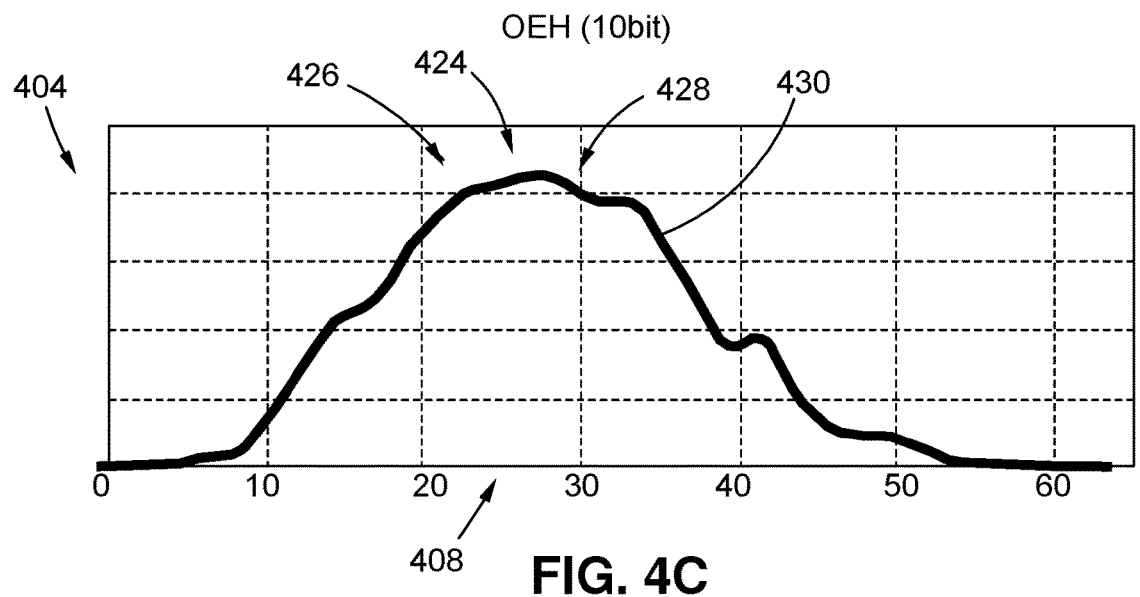
FIG. 4C illustrates exemplary plots of open eye area for various equalizer codes using the open eye area method for determining equalizer codes.

FIG. 4C illustrate exemplary plots of open eye area for various equalizer codes using the open eye area method for determining equalizer codes. In FIG. 4C, the vertical axis 404 represents open eye area (OEA) while the horizontal axis 408 represents CTLE codes. As shown, the plot 440 has a peak 424. The peak 424 is associated with the optimal equalizer code. As can be seen in plot 430, the peak 424 is easier to distinguish over adjacent plot points 426, 428 which are associated with good but non-optimal equalizer codes. As can be seen in FIG. 4C the plot 440 has a greater slope value than the plot 420 of FIG. 4A thus making it easier to distinguish the peak 424 from other points on the plot.

Figure 4D:
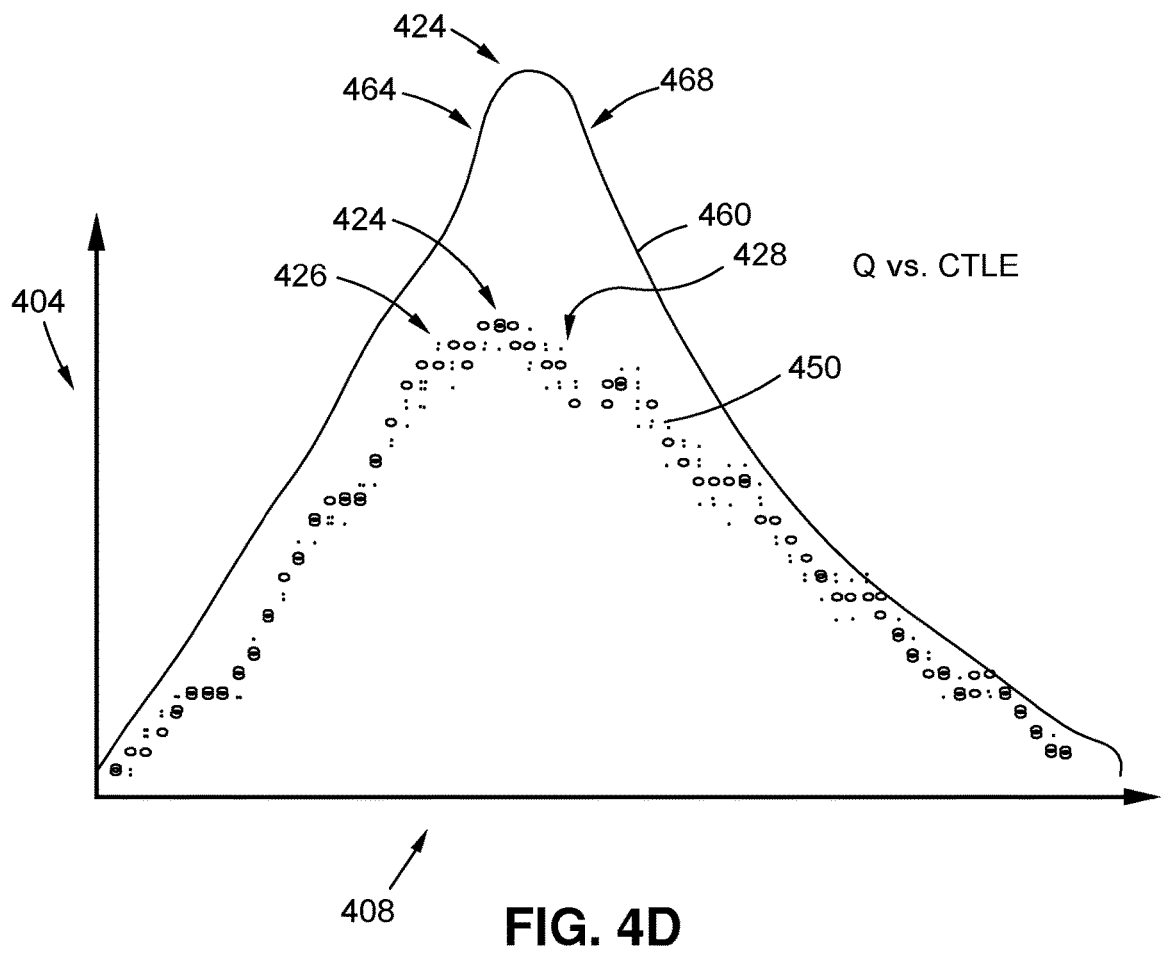
FIG. 4D illustrates exemplary plots of Q and $Q^2$ values for various equalizer codes using a Q calculation method and a $Q^2$ calculation method for determining optimal equalizer codes.

FIG. 4D illustrates exemplary plots of Q and $Q^2$ values for various equalizer codes using a Q calculation method and a $Q^2$ calculation method for determining optimal equalizer codes. In FIG. 4D, the vertical axis 404 represents Q while the horizontal axis 408 represents CTLE codes. As shown, the plot 450 has a peak 424 and is calculated using the Q calculation method disclosed herein. The peak 424 is associated with the optimal equalizer code. As can be seen in plot 450, the peak 424 is easier to distinguish over adjacent plot points 426, 428 which are associated with good but non-optimal equalizer codes.

Similarly, as shown, plot 460 has a peak 424 and is calculated using the $Q^2$ calculation method disclosed herein. The peak 424 is associated with the optimal equalizer code. As can be seen in plot 460, the peak 424 is easier to distinguish over adjacent plot points 464, 468 which are associated with good but non-optimal equalizer codes. As can be seen in FIG. 4D the plot 450 and 460 have a greater slope value than the plot 420 of FIG. 4A, thus making it easier to distinguish the peak 424 from other points on the plot.

Figure 5:
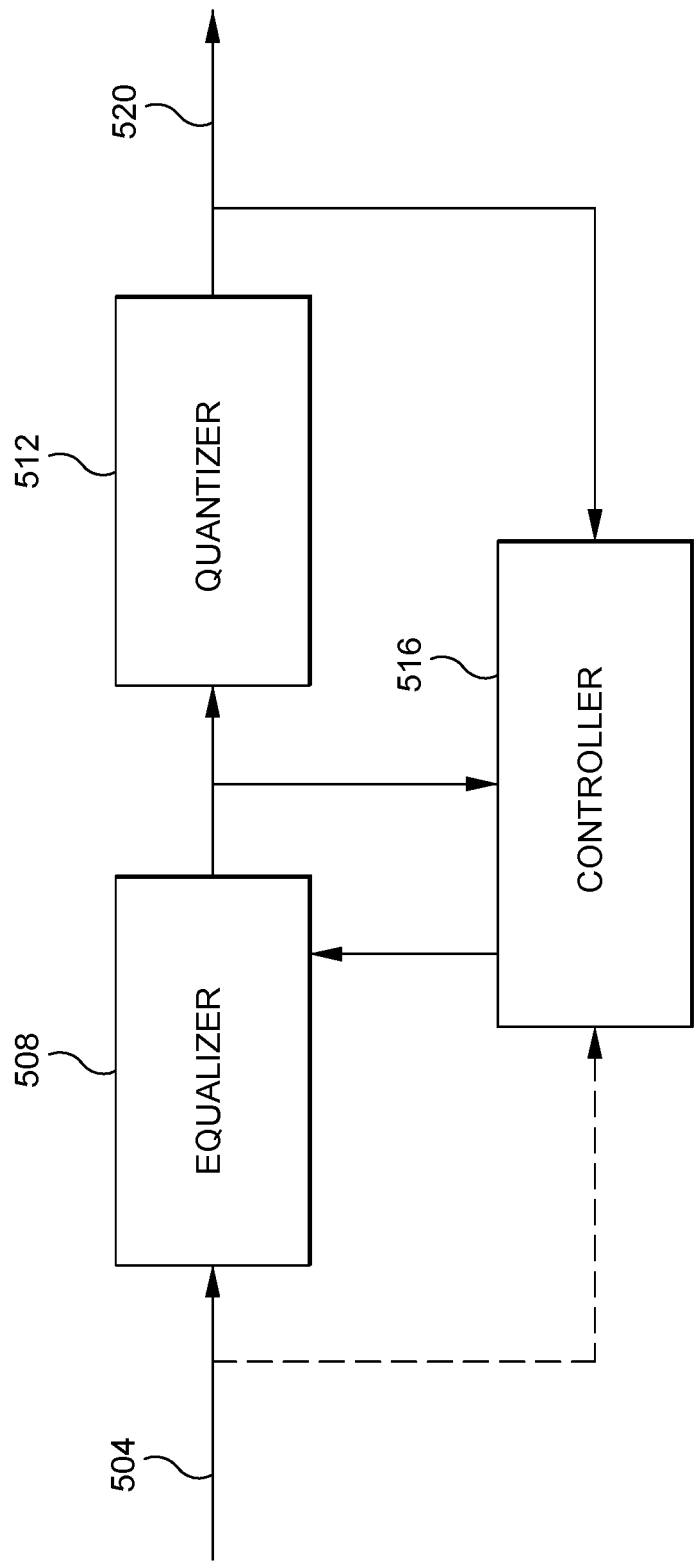
FIG. 5 is a block diagram of an exemplary receiver with equalizer.

FIG. 5 is a block diagram of an exemplary receiver with equalizer. This is but one possible block diagram. An input 504 provides an input signal from a channel (optic, wireline, wireless) to the equalizer for equalization to mitigate the distorting effects of the channel. The equalizer performs frequency specific manipulation of the signal and provide an equalized signal to a quantizer 512 and a controller 516. The quantizer 512 may be a slicer or any device configured to compare and quantize an input signal to two or more logic levels or predetermined values based on a comparison of the input signal to one or more threshold values. Quantizer 512, such a slicer, are known by those of ordinary skill in the art and as such is not described in detail. The output of the quantizer 512 is presented on an output 520 for subsequent processing and to the controller 516.

The controller 516 may be any combination of hardware, software, or both configured to processes signal and/or the equalizer output and based on the analysis, execute the method steps discussed herein to identify the optimal equalizer codes (settings) that provide the optimal equalization. The controller 516 performs one or more successive iterations with difference equalizer codes and, processs and analyze the resulting equalizer output for a code the results in the optimal equalizer codes according to the embodiments described herein. Feedback and comparisons from the input signal on input 504 and the output signal on output 520 may also be considered by the controller 516.

The controller 516 may include an eye monitor capable of detecting and monitoring one or more aspects of an eye of an eye diagram plot, such as the above-mentioned open eye height (OEH) method, open eye area (OEA) method, and Q or $Q^2$ method. In one embodiment, the controller 516 is configured as a finite state machine with a limited instruction set and thus capable of executing machine executable instructions that may be stored in a memory in a non-tangible format. To enable high speed operation many functions are enabled in hardware, such as a state machine, or at partially in hardware and partially in software executed on a processor. For example, a purely hardware configuration may be used, or a DSP, ASIC, processor executing software code, statement or any other element configured to perform as described herein.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for processing a signal, received over time, to generate equalizer codes which are used to control equalization of the signal, the method comprising:
   processing the signal to identify the eyes of the signal;
   processing the signal to calculate an eye height for each eye;
   processing the signal to calculate a noise value for each eye;
   for each eye, multiplying the eye height by the eye height to generate an eye height product;
   for each eye, dividing the eye height product by the noise value to generate a $Q^2$ value, and;
   using the calculated $Q^2$ values, adapting the equalizer codes to an optimal equalizer setting.

2. The method of claim 1 wherein the method further comprises calculating the noise values by:
   calculating an ISI value for each band of the signal;
   calculating the eye height for each eye as the difference between the adjacent upper average value and the adjacent lower average value; and
   for each eye, calculating a noise value by summing the ISI value for the band above the eye and the band below the eye.

3. The method of claim 1 wherein each band is a possible quantizer output level.

4. The method of claim 1 wherein the optimal equalizer settings establish the smallest eye as large as possible or establish the sum of all eyes as large as possible.

5. The method of claim 1 wherein the signal is a PAM format signal and there are four bands and three eyes.

6. The method of claim 1 wherein the method occurs in a communication system to account for signal degradation in a channel.

7. The method of claim 1 wherein the adapting the equalizer codes comprises an iteration process in which two or more different the equalizer codes are used to generate different equalizer outputs and the different equalizer outputs are processed and compared to determine optimal equalizer codes based on Q or $Q^2$ values.

8. A method for processing a signal, received over time, to generate equalizer codes comprising:
   process the signal to identify the eyes of the signal;
   process the signal to generate ISI values for each band of the signal;
   calculate the eye height for each eye as the difference between the adjacent upper average value and the adjacent lower average value;
   for each eye, calculating a noise value by summing the ISI value for the band above the eye and the band below the eye;
   divide each eye height by the calculated noise value for the associated eye to thereby generates a Q value for each eye;
   using the calculated Q values, adapting the equalizer codes to an optimal equalizer setting.

9. The method of claim 8 wherein the optimal equalizer settings establish the smallest eye as large as possible or establish the sum of all eyes as large as possible.

10. The method of claim 8 wherein the signal is a PAM format signal.

11. The method of claim 8 wherein the method is performed in a communication system to account for signal degradation in a channel.

12. The method of claim 8 further comprising the squaring each Q value to more easily identify a peak in the Q squared values.

13. The method of claim 8 wherein the adapt the equalizer code comprises an iteration process in which two or more different the equalizer codes are used to generate different Q squared values and the Q squared values are compared to determine optimal equalizer codes.

14. A system for equalizing a signal using equalizer codes comprising:
   an equalizer configured to equalize the signal based on equalizer codes;
   a controller configured to process the signal and generate equalizer codes as follows:
      process the signal to identify the eyes of the signal;
      process the signal to generate ISI values for each band of the signal;
         calculate the eye height for each eye as the difference between the adjacent upper average value and the adjacent lower average value;
         for each eye, calculating a noise value by summing the ISI value for the band above the eye and the band below the eye;
         divide each eye height by the calculated noise value for the associated eye to thereby generates a Q value for each eye; and
         using the calculated Q values, adapt the equalizer codes to an optimal equalizer setting.

15. The system of claim 14 wherein the bands are the possible quantizer output levels.

16. The system of claim 14 wherein the optimal equalizer settings establish the largest Q value.

17. The system of claim 14 wherein the signal is a PAM format signal and there are four bands and three eyes.

18. The system of claim 14 wherein the method is performed in a communication system to account for signal degradation in a channel.

19. The system of claim 14 further comprising the squaring each Q value to more easily identify a peak in the Q squared values.

20. The system of claim 14 wherein adapt the equalizer code comprises an iteration process in which two or more different the equalizer codes are used to generate different Q outputs and the different Q are compared to determine optimal equalizer codes.

* * * * *